United States Patent [19]

Charbonneau

[11] 4,395,536
[45] Jul. 26, 1983

[54] PREPARATION OF AROMATIC COPOLYESTERS VIA IN SITU ESTERIFICATION WITH ISOPROPENYL ESTERS OF AN ALKYL ACID

[75] Inventor: Larry F. Charbonneau, Chatham, N.J.

[73] Assignee: Celanese Corporation, New York, N.Y.

[21] Appl. No.: 322,147

[22] Filed: Nov. 17, 1981

[51] Int. Cl.$^3$ .................. C08G 63/06; C08G 63/60
[52] U.S. Cl. .................. 528/206; 528/173; 528/176; 528/179; 528/180; 528/190; 528/191; 528/193; 528/194; 528/207; 528/271
[58] Field of Search ............... 528/173, 176, 179, 190, 528/193, 194, 271, 191, 206, 207

[56] References Cited

U.S. PATENT DOCUMENTS 3,637,595 1/1972 Cottis et al. .................. 528/179
4,316,004 2/1982 Imai et al. .................. 528/179

Primary Examiner—Lester L. Lee
Attorney, Agent, or Firm—Burns, Doane, Swecker & Mathis

[57] ABSTRACT

Provided is a method for preparing aromatic copolyesters involving in situ esterification with an isopropenyl ester of an alkyl acid, e.g., isopropenyl acetate. The process comprises reacting the aromatic hydroxy monomers with an isopropenyl ester of an alkyl acid such as isopropenyl acetate in a polymerization vessel in order to esterify the hydroxy moieties, and then polymerizing the esterified hydroxy monomers with aromatic carboxylic acid monomers in the resultant esterification reaction medium to form the aromatic copolyester. Both the esterification and polymerization reactions can be effectively conducted in the same vessel without having to separate out and/or transfer the esterification products from a separate vessel as the polyester polymerization is conducted in the esterification reaction mixture. The esterification is generally carried out in the presence of an acid esterification catalyst, which is preferably neutralized upon completion of the esterification reaction with a suitable basic neutralizing agent, e.g., barium hydroxide.

39 Claims, No Drawings

PREPARATION OF AROMATIC COPOLYESTERS VIA IN SITU ESTERIFICATION WITH ISOPROPENYL ESTERS OF AN ALKYL ACID

BACKGROUND OF THE INVENTION

1. Field of the Invention

The present invention relates to a process for preparing wholly aromatic polyesters involving the in situ esterification of aromatic hydroxy moieties. More specifically, the present invention involves a process for preparing aromatic polyesters wherein the aromatic hydroxy moieties of the aromatic polyester monomers are acetylated with isopropenyl acetate in the polymerization vessel followed by polymerization to the aromatic polyester.

2. Description of the Prior Art

Wholly aromatic polyester resins, with the aromatic polyester being considered to be "wholly" aromatic in the sense that each moiety present contributes at least one aromatic ring to the polymer backbone, have long been known. For instance, 4-hydroxybenzoic acid homopolymer and copolymers have been provided in the past and are commercially available. Representative publications which discuss wholly aromatic polyester include: (a) "Polyesters of hydroxybenzoic Acids," by Russell Gilkey and John R. Caldewell, *J. of Applied Polymer Sci.*, Vol. II, Pages 198 to 202 (1959), (b) "Polyarylates (Polyesters From Aromatic Dicarboxylic Acids and Bisphenols)," by G. Bier, *Polymer*, Vol. 15, Pages 527 to 535 (August 1974), (c) "Aromatic Polyester Plastics," by S. G. Cottis, *Modern Plastics*, Pages 62 to 63 (July 1975); and (d) "Poly(p-Oxybenzoyl Systems): Homopolymer for Coatings: Copolymers for Compression and Injection Molding," by Roger S. Storm and Steven G. Cottis, *Coatings Plast. Preprint*, Vol 34, No. 1, Pages 194 to 197 (April 1974). See Also, U.S. Pat. Nos. 3,039,994; 3,169,121; 3,321,437; 3,553,167; 3,637,595; 3,651,014; 3,723,338; 3,759,870; 3,767,621; 3,778,410; 3,787,370; 3,790,528; 3,829,406; 3,890,256; and 3,975,487.

Publications disclosing certain polyesters which exhibit melt anisotropy include (a) "Polyester X7G-A Self Reinforced Thermoplastic," by W. J. Jackson, Jr., H. F. Kuhfuss, and T. F. Gray, Jr. 30th Anniversary Technical Conference, 1975 Reinforced Plastics/Composites Institute. *The Society of the Plastics Industry, Inc.*, Section 17-D, Pages 1 to 4, (b) Belgian Pat. Nos. 828,935 and 828,936, (c) Dutch Pat. No. 7505551, (d) West German Nos. 2520819, 2520820, 2722120, 2834535, 2834536 and 2834537, (e) Japanese Nos. 43-223; 2132-116; and 3021-293, (f) U.S. Pat. Nos. 3,991,013; 3,991,014; 4,057,597; 4,066,620; 4,067,852; 4,075,262; 4,083,829; 4,118,372; 4,130,545; 4,130,702; 4,156,070; 4,159,365; 4,169,933; 4,181,792; 4,183,895; 4,188,476; 4,189,996; 4,201,856; 4,224,433; 4,226,970; 4,230,817; 4,232,143; 4,232,144; 4,238,598; 4,238,599; 4,238,600; 4,242,496; 4,245,082; 4,245,084; 4,247,514; 4,267,304; and 4,269,965; and (g) U.K. Application No. 2,002,404.

Additionally, commonly assigned U.S. Pat. No. 4,161,470 claims a polyester of 6-hydroxy-2-naphthoic acid and para-hydroxy benzoic acid, and in commonly assigned U.S. Pat. No. 4,219,461 is claimed a polyester of 6-hydroxy-2-naphthoic acid, para-hydroxy benzoic acid, aromatic diol, and aromatic acid. Moreover, commonly assigned U.S. Pat. No. 4,256,624, claims a polyester of 6-hydroxy-2-naphthoic acid, an aromatic diol and an aromatic diacid. Each of these polyesters exhibits an anisotropic melt phase and is capable of readily undergoing melt processing to form quality fibers, molded articles, etc.

Several procedures are known for preparing aromatic polyester of fiber-forming molecular weight, including the Du Pont direct polymerization procedure. One commonly employed procedure involves thermally reacting aromatic acetate moieties with aromatic carboxylic acid moieties. In other words, the aromatic hydroxy groups are acetylated. The use of acetylated reactants has been of utmost importance when preparing a polyester of an aromatic hydroxy acid since such compounds tend to readily decarboxylate. For example, hydroxybenzoic acid is notorious for severe decarboxylation upon attempted direct esterification.

Several effective acetylating agents are known, among which is isopropenyl acetate, e.g., see "Reactions of Isopropenyl Acetate" by H. J. Hagemeyer, Jr. and D. C. Hull, *Ind. and Eng. Chem.*, Vol. 41., No. 12, pp. 2920–2924 (1949); and, "Acylation. Part III. Acid-catalysed Acetylation by Isopropenyl Acetate" by E. A. Jeffery and D. P. N. Satchell, *J. Chem. Soc.*, p. 1876 (1962). Propanoic acid anhydrides and other alkyl acid anhydrides are also mentioned in the literature as agents for the esterification of hydroxyl groups. In the esterification of aromatic hydroxy polyester monomers prior to polymerization, however, acetic anhydride has been the agent used foremost.

Generally, when employing acetic anhydride or an acetylation reagent, the aromatic hydroxy moieties are initially acetylated in a vessel other than the polymerization vessel. Upon completion of the reaction, the acetylated hydroxy monomers are separated from the reaction mixture and then transferred to the polymerization vessel for polymerization between the acetate moieties and aromatic carboxylic acid moieties. The separate acetylation reaction followed by the separation and transfer of the acetylated hydroxy monomers has been found necessary due to the deleterious effects resulting from conducting the polymerization in the acetylation reaction mixture. However, the operation of separating the acetylated aromatic hydroxy monomers and then transferring same to the polymerization vessel is time consuming and economically wasteful.

Processes have been disclosed wherein in situ acetylation with acetic anhydride has been conducted in the polymerization vessel. See, for example, U.S. Pat. Nos. 3,637,595 and 3,975,487 issued to Cottis et al wherein hydroxy benzoic acid, an aromatic diacid and aromatic diol are refluxed for an extended period of time at elevated temperatures in the presence of acetic anhydride. The quality of the resultant polymer, however, is generally less than that desired with respect to the polymer's ability to provide high strength and high modulus fibers.

The need therefore, has been ever present for a process of preparing wholly aromatic polyesters having a satisfactory inherent viscosity and ability to produce fibers of high strength and high modulus without the time-consuming and economic disadvantages of first having to separate acetylated monomers and then transfer them to a polymerization vessel.

Accordingly, it is an object of the present invention to provide a novel, effective and economically advantageous process for preparing polyesters involving the esterification, and in particular, acetylation, of aromatic hydroxy moieties.

It is another object of the present invention to provide an economic yet effective process for preparing wholly aromatic polyesters when using esterified, and in particular acetylated reactants, wherein but a single reaction vessel may be employed.

Still another object of the present invention is to provide a process for preparing wholly aromatic polyesters of suitable inherent viscosity to provide relatively high strength and high modulus fibers wherein the polymerization reaction can be effectively conducted in the reaction mixture resulting from the initial acetylation of aromatic hydroxy moieties. In other words, it is an object of the present invention to provide an economically advantageous process for preparing polyesters involving an essentially in situ acetylation of aromatic hydroxy moieties, yet which is still most effective in producing a high quality polyester capable of producing high quality fibers.

These and other objects, as well as the scope, nature and utilization of the invention, will be apparent to those skilled in the art from the following description and the appended claims.

SUMMARY OF THE INVENTION

It has now surprisingly been found that wholly aromatic polyesters can be prepared having satisfactory inherent viscosities, e.g., greater than three, and which are capable of readily providing fibers of relatively high strength and high modulus via a process involving essentially in situ esterification of aromatic hydroxy moieties. The process thereby allows one to overcome the prior art deficiencies of having to use two separate reaction vessels, i.e., one for the esterification and the other for the polymerization reaction, without sacrificing polymer properties in terms of the inherent viscosity of the polyester and the strength and modulus of the fibers prepared therefrom.

The process of the invention comprises reacting aromatic hydroxy moiety containing compounds, of which there is at least one, with an isopropenyl ester of an alkyl acid, e.g., isopropenyl acetate, under reaction conditions sufficient to esterify the aromatic hydroxy monomer. Once the esterification has been completed, the esterified monomer compounds are reacted under polymerization conditions with at least one aromatic acid moiety containing compound, whether it is the same or different compound, in the resultant esterification reaction mixture. If desired, the aromatic hydroxy and acid compounds and the isopropenyl ester can be simply charged to the reaction vessel and heated at temperatures sufficient to esterify the aromatic hydroxy moieties and then to polymerize the monomer reactants to thereby form the polyester product. Separation of the esterified compounds and/or transfer to another reaction vessel for polymerization is not needed to prepare the high quality polyester product desired. Preferably, an acid esterification catalyst is employed which is neutralized with a suitable basic reagent, e.g., barium hydroxide, prior to the polymerization. The use of a basic reagent to neutralize the acid esterification catalyst is most preferred in that it has been found that particularly high quality polyester polymers are obtained thereby.

While the use of isopropenyl acetate is most preferred for the purposes of the present invention, the present invention also encompasses the use of isopropenyl esters of alkyl acids other than acetic acid, e.g., isopropenyl propanoate. Such esters are also suitable esterification agents for the purposes of the instant invention. Isopropenyl acetate, however, is the most preferred esterification agent, in terms of availability, cost and effectiveness. Thus, while the present invention will be described in detail in terms of the in situ "acetylation" via isopropenyl acetate, it should be understood that other isopropenyl esters of lower alkyl acids, i.e., having from 1–6 carbon atoms, may also be used in accordance with the present invention.

The process of the instant invention finds particular applicability in the preparation of wholly aromatic copolyesters from hydroxy acids, e.g., hydroxy benzoic acid and hydroxy naphthoic acid, in which case the aromatic hydroxy acid fulfills the roles of both the aromatic hydroxy moiety containing compound and aromatic acid moiety containing compound.

DESCRIPTION OF THE PREFERRED EMBODIMENTS

The process of the instant invention allows one to prepare high quality polyesters, e.g., having an I.V. greater than 3 and capable of readily providing high strength and high modulus fibers, by acetylating and then conducting the polymerization reaction in the same vessel, and thereby avoiding the need to perform any time consuming separation step with regard to the acetylated monomer products. The process, therefore, essentially involves an in situ acetylation in that the polymerization reaction environment includes the resultant acetylation reaction mixture. By "including the resultant acetylation reaction mixture" is meant that the polymerization is conducted within the reaction medium resulting from the acetylation reaction plus any added reactants necessary for the desired polymerization or of any other adjuvants which may benefit the polymerization, and of course, absent any vaporous products which may evolve during the reactions. Accordingly, once the acetylation reaction has been run to completion, the polymerization, upon the addition of any desired adjuvants to the reaction mixture, can be initiated immediately.

The acetylation agent employed in the present invention is isopropenyl acetate. Other isopropenyl esters of lower alkyl acids, however, as discussed before, may also be used in the present invention as esterification agents. The isopropenyl acetate reacts with the aromatic hydroxy moiety containing compounds to thereby acetylate them. The amount of isopropenyl acetate employed is generally a theoretical stoichiometric amount, however, the use of a slight excess is generally preferred.

The acetylation is preferably conducted in the presence of a catalytic amount, i.e., an amount sufficient to increase the rate of acetylation, of a conventional acetylation catalyst, with the most preferred catalysts being the strong acid catalysts such as the sulfonic acids or mineral acids. Preferred examples thereof include p-toluenesulfonic acid, sulfosalicylic acid, methanesulfonic acid, hydrogen chloride, hydrogen bromide, perchloric acid and sulfuric acid.

The acetylation reaction between the isopropenyl acetate and at least one aromatic hydroxy moiety containing compound is conducted under reaction conditions sufficient to acetylate the hydroxy compound. One of the major advantages of the process of the instant invention is that the acetylation can be effectively and efficiently conducted under mild reaction conditions, e.g., at temperatures less than 100° C. The ability to acetylate under such mild conditions is particularly important when aromatic hydroxy acids such as hydroxy benzoic acid are being acetylated as the low temperature deters the decarboxylation of the hydroxy acids.

The temperature at which the acetylation reaction is conducted is generally in the range from about 60° to about 130° C., more preferably from about 70° to 120° C., and most preferably from about 80° to 100° C. If desired, the acetylation reaction temperature can be raised after a predetermined amount of time. For example, the initial reaction temperature can be 85° C. and then raised to 120° C. It is preferred that the initial acetylation reaction temperature be below 100° C. and raised to over 100° C., but generally not greater than about 120° C., when the acetylation reaction has run at least to 50 percent completion. By initially maintaining the reaction temperature below 100° C. and not raising the temperature until the reaction is nearly complete minimizes any problems with decarboxylation. Then by raising the temperature slightly above 100° C. at the end of the acetylation, any excess acetylation by-products or isopropenyl acetate is distilled from the reaction mixture.

The acetylation reaction can be conducted in the presence of an organic solvent. Any of the conventional, hydrocarbon organic solvents are suitable, for example, xylene, mesitylene, Decalin, decane, Therminol ™ etc., with alkyl aromatic hydrocarbon solvents such as xylene being preferred. When selecting a solvent, it is important to remember that the solvent medium will not only be used in the acetylation reaction, but may also be present during the polymerization reaction, since the polymerization reaction environment includes the resultant acetylation reaction mixture in the process of the instant invention. Thus, the solvent chosen should not adversely effect the polymerization reaction. A solvent such as Therminol 66, which is known to be useful as a polymerization solvent, e.g., see U.S. Pat. No. 4,067,852, maintains a fluid medium between the acetylation reaction and polymerization and thereby would be an appropriate solvent medium for the purposes of the present invention.

An inert gas purge, e.g., with nitrogen or argon, can be employed during the acetylation reaction in order to minimize oxidation. This purge can be, and is preferably, continued through the polymerization reaction. Removal and condensation of evolved gases during the acetylation and/or polymerization reactions can also be accomplished easily with conventional equipment such as a distillation head and condenser. Acetone removal is particularly prevalent since acetone is a volatile by-product of the acetylation reaction between isopropenyl acetate and an aromatic hydroxy moiety.

The acetylation reaction is generally conducted until acetylation is essentially complete, i.e., until all of the isopropenyl acetate or hydroxyl moieties have reacted. Although the reaction can be terminated at any point desired. Generally, the acetylation reaction can be completed in a length of time ranging from about 1 to about 5 hours, more preferably from about 2 to about 4 hours and most preferably from about 2½ to about 3½ hours. The exact length of time the reaction is to be conducted, however, will depend upon such variables as the reactants, temperature of reaction, catalyst and catalyst concentration.

Once the acetylation reaction has been completed, the polymerization reaction can be initiated immediately, if desired, provided the required reactants are present. When a strong acid acetylation catalyst is employed, however, it is preferred for reasons of effective polymerization that a suitable basic neutralization agent be added prior to initiation of the polymerization in order to neutralize the acid catalyst. The amount of basic neutralizing agent added would be about the theoretical amount necessary to neutralize all of the acid catalyst. It has been found quite surprisingly that the use of a suitable basic neutralizing agent provides most improved results.

The basic neutralizing agents which can be suitably employed in accordance with the instant invention are any basic compounds, preferably metal hydroxides, which will react with the acid catalyst to neutralize same and not detrimentally effect the polymerization reaction, i.e., a reagent which yields inert products. In general, the use of the neutralization agent should in effect reduce the discoloration of the polymer caused by the presence of free acid, by neutralizing the acid, and result in a product which does not limit the molecular weight of the polymer by causing side reactions which compete with the polymerization reaction. Examples of suitable agents include, but are not limited to, barium hydroxide, calcium hydroxide and magnesium hydroxide. Such metal hydroxides, when reacted with a sulfonic acid catalyst, for example, form an inert metal sulfate. Barium hydroxide is the most preferred basic neutralizing agent.

The aromatic hydroxy moiety containing compounds which can be acetylated by isopropenyl acetate in accordance with the instant invention and subsequently polymerized to form a polyester can be any conventional hydroxy compound suitable for preparing aromatic polyesters. For example, the aromatic hydroxy moiety containing compounds can be an aromatic diol which contains one or more aromatic rings, with the hydroxyl groups being attached to the same or different rings. Where the aromatic diol contains more than one aromatic ring, the rings may be fused, e.g., as in a naphthalene or anthracene moiety, or connected by a bond or a divalent radical such as an alkyl, oxyl, thio, thionyl, or sulfonyl radical. The aromatic diol is preferably symmetrical in the sense that the hydroxyl groups are symmetrically disposed, e.g., para to each other when on one aromatic ring or diagonally disposed, i.e., 2 and 6 positions, when present on a naphthalene ring. If desired, the diol ring or rings may also bear one or more substituents, such as an alkyl, aryl or halo substituent, which is inert in the polymerization reaction.

The amount of such aromatic diol employed in the reaction will vary based upon the desired properties of the resultant polymer product. It is preferred, however, in forming an anisotropic, melt processable polyester that the amount of aromatic diol used be in the range from about 5 to about 45 mole percent of the total monomer reactants, more preferably from about 10 to about 40 mole percent, and most preferably from about 10 to about 25 mole percent.

Representative examples of suitable aromatic diols include hydroquinone, resorcinol, methylhydroquinone, chlorohydroquinone, bromohydroquinone, phenylhydroquinone, 4,4'-biphenol, 4,4'-oxydiphenol, 4,4'-methylenediphenol, 4,4'-sulfonyldiphenol, 2,6-dihydroxynaphthalene, 2,6-dihydroxyanthraquinone, 4,4'-(1,2-ethanediyl) bisphenol etc., and mixtures thereof. A particularly preferred aromatic diol is hydroquinone.

The aromatic hydroxy moiety containing compounds which are suitable for the purposes of the instant invention also include aromatic hydroxy acids, e.g., such as hydroxy benzoic acid and hydroxy naphthoic acid, same being the most preferred aromatic hydroxy acids. The hydroxy acids also supply aromatic acid moieties with which the acetylated hydroxy moieties react to form the polyester.

Suitable hydroxy naphthoic acid reactants in accordance with the instant invention may have some additional substitution on the aromatic rings beside the hydroxy and carboxyl moieties. Such optional substitution may be with substituents inert in the polymerization reaction, e.g., alkyl, alkoxy, aryl, halo and mixtures thereof. When the substituent is an alkyl or alkoxy, it preferably contains from 1 to about 4 carbons. When the substituent is an aryl, it preferably contains from 6 to 10 carbons (e.g., phenyl). When the substituent is an halogen, it is preferably selected from the group consisting of fluorine, chlorine, and bromine. The presence of such ring substituents can tend to modify to some extent the physical properties of the resulting polyester polymer, e.g., the polymer may soften at a lower temperature, its impact strength may be improved, and the crystallinity of the solid polymer formed may be decreased. The specific properties desired in the polyester product will influence the choice of substituents on the hydroxy naphthoic acid reactant. The most preferred hydroxy acid is 6-hydroxy-2-naphthoic acid without any further ring substitution, which can be employed to provide a copolyester of optimum crystallinity in the solid state.

Representative examples of substituted hydroxy naphthoic acid reactants include: 6-hydroxy-5-chloro-2-naphthoic acid, 6-hydroxy-5-methyl-2-naphthoic acid, 7-hydroxy-5-methoxy-2-naphthoic acid, 6-hydroxy-7-chloro-2-naphthoic acid, etc., and mixtures thereof.

The amount of hydroxy naphthoic acid employed can vary greatly, but it is generally preferred that the amount be within the range of from about 10 to 90 mole percent of the total monomer reactants. When the hydroxy naphthoic acid is to form a simple copolymer with an aromatic dicarboxylic acid, e.g., terephthalic acid, the amount of hydroxy naphthoic acid employed is more preferably in the range from about 50 to 70 mole percent of the total monomer reactants. Otherwise, however, the amount of hydroxy naphthoic acid employed is more preferably in the range from about 15 to 35 mole percent, and most preferably in the range from about 20 to 30 mole percent, e.g., approximately 25 mole percent.

Suitable hydroxy benzoic acid reactants for purposes of the instant invention may also contain some additional substitution on the aromatic ring beside the hydroxy and carboxyl moieties. Such optional substitution may be with substituents inert in the polymerization reaction, e.g., alkyl, alkoxy, aryl, halo and mixtures thereof. When the substituent is an alkyl or alkoxy, it preferably contains from 1 to about 4 carbons. When the substituent is an aryl, it preferably contains from 6 to about 10 carbons (e.g. phenyl). If the substituent is an halogen, it is preferably selected from the group consisting of fluorine, chlorine, and bromine. The presence of such ring substituents can tend to modify to some extent the physical properties of the resulting polyester polymer, as discussed with regard to the hydroxy naphthoic acid reactant. In a preferred embodiment, unsubstituted p-hydroxybenzoic acid is employed in order to provide a resulting copolyester of optimum crystallinity in the solid state.

Representative examples of other suitable hydroxy benzoic acid reactants include 3-chloro-4-hydroxy benzoic acid, 2-chloro-4-hydroxy benzoic acid, 2,3-dichloro-4-hydroxy benzoic acid, 3,5-dichloro-4-hydroxy benzoic acid, 2,5-dichloro-4-hydroxy benzoic acid, 3-bromo-4-hydroxy benzoic acid, 3-methyl-4-hydroxy benzoic acid, 3,5-dimethyl-4-hydroxy benzoic acid, 2,6-dimethyl-4-hydroxy benzoic acid, 3-methoxy-4-hydroxy benzoic acid, 3,5-dimethoxy-4-hydroxy benzoic acid, etc.

The amount of hydroxy benzoic acid employed can vary greatly, but it is preferred that the amount employed by generally within the range of from about 10 to 90 mole percent of the total monomer reactants, more preferably in the range from about 65 to 85 mole percent, e.g., approximately 75 mole percent.

If desired, a mixture of hydroxy benzoic acids may be employed, for example, a mixture of p-hydroxy benzoic acid and m-hydroxy benzoic acid.

Besides the aromatic hydroxy acids, other suitable aromatic acid moiety containing compounds for the purposes of the instant invention include conventional aromatic dicarboxylic acids from which polyesters have been prepared. Such aromatic diacids can contain one or more aromatic rings, with the carboxyl groups being attached to the same or different rings. Where the aromatic dicarboxylic acid contains more than one aromatic ring, the rings may be fused, e.g., as in a naphthalene or anthracene moiety or connected by a bond or a divalent radial such as an alkyl, oxy, thio or thionyl radical. The dicarboxylic acid is preferably symmetrical in the sense that the carboxyl groups are symmetrically disposed, e.g., para to each other when on one aromatic ring or diagonally disposed, i.e., 2 and 6 positions, when present on a naphthalene ring. If desired, the acid ring or rings may bear one or more substituents, such as an alkyl or aryl substituent, which is inert in the polymerization reaction.

In the polymerization reaction, the amount of aromatic dicarboxylic acid employed can vary greatly and will depend upon the type of properties the polyester product is to possess. When forming an anisotropic, melt processable polyester, however, it is preferred that the amount of aromatic dicarboxylic acid used is from about 5 to about 45 mole percent of the total monomer reactants, more preferably from about 10 to about 40 mole percent, and most preferably from about 10 to about 25 mole percent.

Representative examples of suitable aromatic dicarboxylic acids for purposes of the instant invention include terephthalic acid, isophthalic acid, 2,6 and 2,7-naphthalene dicarboxylic acids, 4,4'-biphenyldicarboxylic acid, 4,4'-oxydibenzoic acid, 4,4'-thiodibenzoic acid, 4,4'-sulfonyldibenzoic acid, and mixtures thereof. A particularly preferred aromatic dicarboxylic acid is terephthalic acid.

The aromatic acid moiety compounds with which the acetylated moieties react to form the polyester can be present initially, i.e., during the acetylation reaction, or can be added to the reaction vessel when complete initiation of the polymerization reaction is desired. Of course, when an aromatic hydroxy acid is employed, same will be initially present in order that the hydroxy moiety can be acetylated to thereby prevent decarboxylation. One of the major advantages of the present invention is that the polymerization can essentially be fully initiated immediately after acetylation is complete without the need for any transfer or separation of the acetylated monomer products. Generally, complete initiation of the polymerization reaction can be achieved by simply raising the reaction temperature to a temperature greater than 180° C., in the range of from about 180° to about 350° C.

In general, the polymerization reaction is conducted under conventional polyester polymerization conditions. The time, temperature and pressure conditions to be employed for optimum results depends on the specific reactants used and on the specifically selected catalyst. It is important, however, that the reactants and the resulting polymer suffer no substantial degradation under the polymerization conditions employed.

It is preferred to conduct the reaction under conventional conditions of melt polymerization, thereby requiring that the polymerization temperature be at least high enough so that at least one of the reactants and the aromatic polyester polymer product are in a melt phase. Temperatures in the range of from about 180° C. to about 400° C. can generally be employed, with a temperature in the range from about 225° C. to about 360° C. being preferred, and a temperature in the range from about 250° C. to about 330° C. being most preferred. Accordingly, when melt polymerization conditions are to be employed, the temperature should be raised to a temperature of at least 225° C., although the initiating polymerization temperature need not be 225° C. However, the temperature should ordinarily not be so great as to cause degradation of the polymer as may be observed from undue darkening of the polymer.

If desired, a vacuum can be applied at a suitable place in the polymerization to rapidly remove volatile by-products and to hasten the polymerization after sufficient reaction has taken place so that the loss of reactants through sublimation or other means is minimized. Other than during the vacuum cycle, the reaction is conducted generally at atmospheric pressure, although this may vary if desired. Also, to minimize oxidation, the reaction can be carried out in an inert atmosphere such as nitrogen, carbon dioxide or argon, in which case the inert gas purge from the acetylation reaction, if employed therein, need only be continued.

Other polymerization techniques, however, e.g., a slurry polymerization, such as that described in commonly assigned U.S. Pat. No. 4,067,852 of Gordon W. Calundann, entitled "Melt Processable Thermotropic Wholly Aromatic Polyester Containing Polyoxybenzoyl Moiety" wherein the solid product is suspended in a heat exchange medium, may also be employed. The disclosure of the Calundann patent is herein incorporated by reference.

The reaction can also be conducted in the presence of a catalytic amount of a polymerization catalyst. A catalytic amount is an amount sufficient to increase the rate of polymerization, which can be measured by the inherent viscosity of the resulting polyester. The quantity of catalyst utilized is typically in the range from about 0.001 to about 1 weight percent based upon the total monomer reactant weight, with from 0.005 to about 0.2 weight percent being preferred, and from 0.01 to about 0.1 weight percent being most preferred.

Representative examples of catalysts suitable for use in the reaction are simple substances as lithium, sodium, potassium, magnesium, calcium, and so on; or compounds of these simple substances and titanium, manganese, cobalt, zinc, tin, antimony, lanthanum, cerium, lead, germanium such as for example their oxides, hydrides, hydroxides, halides, alcoholates, phenolates, organic and inorganic acid salts, complex salts, mixed salts, and so forth. More specifically, there can be exemplified sodium metal, sodium hydroxide, lithium acetate, sodium acetate, potassium acetate, calcium benzoate, calcium acetate, magnesium acetate, titanium tetrabutoxide, titanium tetraphenoxide, manganese acetate, cobalt acetate, cobalt chloride, zinc oxide, stannous acetate, stannous benzoate, antimony trioxide, lanthanum hydroxide, cerium carbonate, lead oxide, germanium oxide, titanium trisacetyl acetonate, etc. Of these compounds, the above-mentioned alkali acetate compounds are particularly preferable.

When a polymerization catalyst is employed, it can be added at any time, but is preferably added prior to initiation of the polymerization.

The polymerization reaction is generally conducted until the desired molecular weight (e.g., fiber forming) has been reached. Preferably, the wholly aromatic polyesters prepared have a weight average molecular weight in the range from about 2,000 to about 200,000 more preferably from about 10,000 to about 50,000, and most preferably from about 20,000 to about 25,000. The molecular weight may be determined by standard techniques not involving the solutioning of the polymer, e.g., by end group determination via infra red spectroscopy on compression molded films. Alternatively, light scattering techniques in a pentafluorophenol solution can be employed to determine the molecular weight.

The inherent viscosity (i.e., I.V.) of the polyester can also be measured, and is preferably at least 3.0, and more preferably at least about 3.5, e.g., from 3.5 to 7.5, when dissolved in pentafluorophenol at a concentration of 0.1 percent by weight at 60° C.

The process of the instant invention finds particular utility in the preparation of wholly aromatic, anisotropic, melt processable polyesters such as those disclosed in U.S. Pat. Nos. 4,161,470, 4,219,461 and 4,256,624, whose disclosures are hereby expressly incorporated by reference. Each of said polyesters involve a moiety derived from an aromatic hydroxy acid such as para-hydroxy benzoic acid and/or 6-hydroxy-2-naphthoic acid, which particular polyesters are not intractable and form an anistropic melt phase whereby an atypical degree of order is manifest in the molten polymer. The polyesters readily form liquid crystals in the melt phase and accordingly exhibit a high tendency for the polymer chains to orient in the shear direction. Such anisotropic properties are manifest at a temperature which is amenable for melt processing to form shaped articles. Such order in the melt may be confirmed by conventional polarized light techniques whereby crossed polarizers are utilized. More specifically, the anisotropic melt phase may conveniently be confirmed by the use of a Leitz polarizing microscope at a magnification of 40X with the sample on a Leitz hot stage and under a nitrogen atmosphere. The polymer melt is optically anisotropic, i.e., it transmits light when examined between crossed polarizers. The amount of light transmitted increases when the sample is sheared (i.e., is made to flow), however, the sample is optically anisotropic even in the static state.

The present invention provides one with a more economically attractive and direct method for preparing wholly aromatic polyesters, and in particular the afore-discussed wholly aromatic melt processable polyesters, than has previously been known when utilizing acetylated monomers, yet without having to sacrifice in regard to the quality of the polymer. The need for separately acetylating the hydroxy moieties in a separate vessel and/or separating the acetylated monomer products from the acetylation reaction medium in order to insure quality polyester products are avoided by the process of the instant invention. The present invention, therefore, allows one to prepare such valuable polyesters as the aforediscussed much more cheaply and easily so that the advantages of such polyesters may be more readily exploited.

Moreover, by being able to acetylate under mild conditions, such as a temperature below 100° C., the present invention allows one to deal with the problem of decarboxylation of aromatic hydroxy acids most effectively. Decarboxylation is accelerated at elevated temperatures.

The following examples are given as specific illustrations of the claimed invention. It should be understood, however, that the specific details set forth in the examples are merely illustrative and in nowise limitative. All parts and percentages in the examples and the remainder of the specification are by weight unless otherwise specified.

EXAMPLE I

A 300 ml 3-neck flask is equipped with a glass paddle stirrer, a Claisen adapter, a nitrogen inlet, a distillation head, condenser, and receiver. The following monomers and catalyst are added: 27.6 g of 4-hydroxybenzoic acid (0.2 mole), 46.5 g of 6-hydroxy-2-naphthoic acid (0.3 mole), and 10 mg of p-toluenesulfonic acid. The reaction vessel is evacuated and purged with nitrogen three times, then placed under a slow flow of nitrogen (ca. 40 ml/min). The acetylating agent, isopropenylacetate (IPPA) is added to the monomers and catalyst via the Claisen adapter; the theoretical stoichiometric amount of IPPA (0.5 mole) is utilized and 50 ml of acetone is added as a diluent.

The reaction vessel is heated via an external fluidized sand bath to 70° C. to initiate acetylation. The bath is then raised to 85 ° C. over the period of an hour, to 111° C. for 30 minutes, then to 250° C. over a period of 30 minutes. Polymerization is conducted between 250° C. and 312° C. for 45 minutes, at 312° C. for 3⅓ hours, at 320° C. for 30 minutes, then under vacuum for one hour at 320° C. After placing the vessel under atmospheric pressure nitrogen, the stirrer is removed and weak brittle fibers are removed from the melt via the stirrer.

The polymer is cooled to room temperature recovered from the reaction vessel and characterized by differential scanning calorimetry (DSC) (20° C./Min.) and solution viscometry. Endothermic transitions are found at 280° C. and 295° C. by DSC. The inherent viscosity (0.1% in pentafluorophenol at 60° C.) is 0.47.

EXAMPLE II

The apparatus described in Example I is charged with the following monomers: 48.3 g of 4-hydroxybenzoic acid (0.35 mole) and 28.2 g of 6-hydroxy-2-naphthoic acid (0.15 mole). Sulfosalicylic acid (0.076 g) is added as catalyst. After evacuation and purging as in Example I, 50 ml of p-xylene is added as a diluent and 60 ml of isopropenyl acetate (IPPA) (109% of theoretical) is added as the acetylating agent. The reaction vessel is warmed to 70° C., as in Example I, and maintained at 70° C. for 2 hours. Samples of the reaction mixture are withdrawn after 1 and 2 hours for gas chromatographic analysis (GLPC). The one hour sample found less than 25% of IPPA remaining. At the end of two hours, essentially all the IPPA had reacted.

The reaction vessel is raised to 87° C. for one hour, and to 120° C. for an additional hour, then to 250° C. to initiate polymerization. The first 50% of the distillate (collected before ca. 219° C.) contains mainly acetone and p-xylene, a small amount of acetic acid, and a trace of IPPA. The next distillate fraction contains a trace of acetone and mainly xylene and acetic acid; this fraction is obtained when the sand bath temperature reaches 257° C. The last fraction of the distillate contains acetic acid. Polymerization is conducted between 250° C. and 320° C. for 4 hours and for 1 hour under vacuum (0.3 Torr) at 330° C. Strong fibers are removed from the reaction vessel via the stirrer.

When the polymer has cooled to room temperature, it is ground through a 6 mm screen in a Wiley mill, extracted (Soxhlet extractor) with acetone for one hour, then dried at 130° C. for one day before fiber spinning.

Polymer characterization by DSC and solution viscometry, as in Example I, finds endothermic transitions at 260° C. and 274° C.; the inherent viscosity is 3.23.

When the fibers are melt spun at 315° C. through a 0.007 inch single hole jet at a through-put rate of 0.14 g/min. and filament wind-up-speed of 679 m/mins., monofilament properties are:
6.8 g/d tenacity,
1.74% elongation,
514 g/d initial modulus
1.97 denier/fil Upon heat treatment of the fiber in an oven under a nitrogen atmosphere for 30 hours at 280° C., the monofilament properties increased to a tenacity of 17.5 g/d, an elongation of 3.2% and an initial modulus of 543 g/d.

EXAMPLE III

The apparatus, quantities of monomers, IPPA, xylene and sulfosalicylic acid are the same as for Example II. Acetylation is conducted at 85° C. for 2 hours and at 120° C. for 1 hour. The first 25% of the distillate is collected at this point and analyzed by GLPC. This fraction contains mainly acetone, a very small amount of IPPA, and minor amounts of xylene and acetic acid.

The reaction temperature is raised to 240° C. for over 30 minutes to initiate polymerization. The distillate center cut (middle 50%) is taken when the temperature reached 240° C. and is found to contain mainly xylene and minor amounts of acetone and acetic acid. Polymerization is conducted between 240° C. and 280° C. for 20 minutes, between 280° C. and 300° C. for 15 minutes, and at 320° C. for 20 minutes, then under vacuum (1.4 Torr) for 30 minutes at 340° C. Strong fibers are pulled from the pot via the stirrer.

The polymer is ground, extracted, and characterized as in Example II. The I.V. is 4.29, and endotherms are found at 265° C. and 272° C.

Monofilaments are spun through a 0.007 inch jet at 299° C., a polymer through-put rate of 0.14 g/min., and fiber wind-up-speed of 521 m/min. The properties of this monofilament are:
8.85 g/d tenacity
1.94% elongation
580 g/d initial modulus
2.51 denier/fil Heat treatment for 30 hrs at 280° C. gave a monofilament exhibiting a tenacity of 19.2 g/d, an elongation of 3.5% and an initial modulus of 549 g/d.

EXAMPLE IV

This example uses methane sulfonic acid as the acetylation catalyst, and additionally uses barium hydroxide to deactivate the catalyst after acetylation. The apparatus described in Example 1 is charged with 48.3 g of 4-hydroxybenzoic acid (0.35 mole) and 28.2 g of 6-hydroxy-2-naphthoic acid (0.15 mole). After evacuation and purging with nitrogen three times, 50 ml of p-xylene and 60 ml of IPPA (109% of theoretical) is added to the reaction flask; 2 ml of 1% (w/v) solution of methane sulfonic acid in acetone is added as catalyst. The reaction vessel is warmed via a sand bath to approximately 85° C. for 2 hours, then to 120° C. for 2 hours. Acetylation is judged complete at this time (by GLPC analysis) and 50 mg of barium hydroxide hydrate ($Ba(OH)_2.8H_2O$) is added to the reactants.

The vessel temperature is raised to 250° C. to initiate polymerization and remove the xylene diluent; 58% of the expected distillate volume is collected at this point. Polymerization is conducted between the temperatures of 250° C. and 340° C. for 3½ hours, of which the final ¾ hour was at reduced pressure (0.35 Torr); a total of 85% of the theoretical distillate is collected (102 ml). While flooding the reaction vessel with nitrogen, the stirring shaft is removed and strong light colored fibers are pulled from the flask. The polymer is ground and extracted as in previous examples. Characterization by DSC and solution viscometry, as in Example I, finds an endothermic transition at 267° C.; the inherent viscosity is 6.66.

Monofilaments are spun at 315° C. at a through-put rate of 0.42 g/min. and the fiber is wound up at a rate of 1156 meters/min.; the jet diameter is 0.007 in. The monofil properties are:
11.1 g/d tenacity
2.46% elongation
569 g/d initial modulus
3.51 denier/fil After heat-treatment in a flowing stream of nitrogen at 280° C. for 30 hours, the monofil properties increase to 19.8 g/d tenacity, 3.56% elongation, and 533 g/d initial modulus.

EXAMPLE V

A 300 ml three-neck flask is equipped with a glass paddle stirrer, a Claisen adapter, a nitrogen inlet, a distillation head, a condenser, a receiver, and a solids addition flask. 56.5 g of 6-hydroxy-2-naphthoic acid and 11.0 g of hydroquinone are placed in the three-necked flask and 16.6 g of terephthalic acid, 50 mg barium hydroxide octahydrate, and 10 mg of sodium acetate are added to the solids addition flask. The assembled apparatus is evacuated and purged three times with nitrogen, then 50 ml of p-xylene (Aldrich, 99%) and 60 ml of isopropenyl acetate are added to the three-necked reaction flask. The reaction flask is heated via an external oil bath to maintain the contents of the flask at 85° C. to 120° C. over a one-hour period. When the reactants reach 120° C., they are held at this temperature for an additional hour, and the contents of the solids addition flask (terephthalic acid, barium hydroxide, sodium acetate) is added to the reaction flask. The reactants' temperature is increased to 250° C. over a one-hour period to initiate polymerization. Polymerization is conducted between 250° C. and 330° C. for two and a half hours under nitrogen and under vacuum (1.0 mm) for forty-five minutes at 330° C.

After cooling to room temperature, the polymer is recovered from the reaction flask, ground in a Wiley mill and extracted and characterized as in Example II. The polymers' IV is 4.51 and DSC finds an endothermic transition at 275° C. When spun with the apparatus described in Example II at 315° C., monofilaments obtained at a throughput rate of 0.42 g/min and wound up at 174 m/min have the following properties:
4.6 g/d tenacity
1.15% elongation
514 g/d initial modulus
22.0 denier/fil

Comparative Example I

This example describes the in situ-acetylation of a 70:30 mole ratio of a 4-hydroxy-benzoic acid:6-hydroxy-2-naphthoic acid mixture with an amount of acetic acid anhydride necessary to acetylate the hydroxybenzoic-hydroxynaphthoic acid mixture.

The apparatus described in Example 1 is charged with 48.3 g of 4-hydroxybenzoic acid (0.35 mole) and 28.2 g of 6-hydroxy-2-naphthoic acid (0.15 mole); 0.007 g of sodium acetate is added as a catalyst. The reaction flask is evacuated and purged three times with nitrogen, and then 52 ml (0.55 mole) of acetic anhydride is added to the flask. The distilling condenser is changed to the reflux position and the reactants are heated to 140° C. for 17 hours via an external oil bath. At the end of the reflux period the condenser is returned to the distillation position and the reactants are warmed to 250° C. (over a two hour period) 59% of the theoretical acetic acid has distilled when the temperature reached 250° C. Polymerization continues for 1 and ¼ hrs. between 250° and 330° C., and for ½ hour at 330° C. under vacuum (0.35 Torr). 78.4% of the acetic acid is collected before the vacuum segment of the polymerization. After grinding and acetone extraction, as in the previous examples, the polymer is examined by DSC and solution viscometry. A broad endotherm from approximately 245° C. to 255° C. is found by DSC and the polymers inherent viscosity is 0.60.

Fiber is spun through a 0.007 in. diameter jet at 269° C. Single fils that are spun at a through-put rate of 0.42 g/min. and wound up at 348 m/min. had the following properties:
1.76 g/d tenacity
0.75% elongation
252 g/d initial modulus
0.5 denier/fil

Comparative Example II

Another polymerization is conducted using the same quantities of monomer, acetic anhydride, and sodium acetate as in Comparative Example I. The reactants are, as in the previous example, warmed from 140° C. (after 17 hours of reflux) to 250° C. over a 2 hour period (57.6% acetic acid removed). Polymerization is conducted between 250° and 330° C. for 1 and ¼ hours. The pressure in the reaction vessel is reduced to 121 Torr, and polymerization continues at 330° C. for an additional 1 and ¼ hours (86.4% acetic acid removed). During this period, polymer viscosity appears to increase, then decrease. During further polymerization for 1 and ¼ hour at 330° C. and 0.4 Torr, the viscosity of the polymer again appears to increase as judged by the tendency of the polymer to form a ball on the stirrer, and by the stringy nature of the melt. After work-up and extraction as in previous examples this polymer is characterized by DSC and solution viscometry. Two endotherms are found at 260° C. and 275° C. by DSC, and its inherent viscosity is 3.67.

Fibers are spun through a 0.007 in. diameter jet at 330° C., a through-put rate of 0.42 g/min., and a take-up speed of 312 m/min. Fiber properties are:
8.0 g/d tenacity
2.02% elongation
529 g/d initial modulus
4.06 denier/fil The fiber is heat treated at 275° C. for 15 hours under a flowing atmosphere of nitrogen. The properties increased to 14.6 g/d tenacity, 3.06% elongation, and 501 g/d initial modulus. Another heat treatment for 30 hours at 280° C. gives the following fiber properties: 17.9 g/d tenacity, 3.32% elongation, and 529 g/d initial modulus. A second sample of fiber with as-spun properties of 7.9 g/d tenacity; 2% elongation; 574 g/d initial modulus and 3 denier per fil increased to 13.3 g/d tenacity; 3.3% elongation; and, 433 g/d initial modulus under the same conditions of 30 hrs. at 280° C.

Comparative Example III

This is another example using the same quantities of monomers, acetylating agent (acetic anhydride), and sodium acetate catalyst as in Comparative Example I and II. As in the previous two comparative examples, the monomers are refluxed in acetic anhydride for 17 hours at 140° C., then the reaction vessel is warmed to 250° C. over a 2 hour period; 70.8% of the theoretical acetic acid has been collected at this time. Additional polymerization between 250° and 330° C. for 1 and ¼ hours produces 89.7% of the theoretical acetic acid. The pressure in the reaction vessel is reduced to 120 Torr, and polymerization is conducted at this pressure for 1½ hours. Further polymerization is conducted at 330° C. and a pressure of approximately 0.6 Torr for a period of 1 and ½ hours. An odor of phenol is present in the distillation condenser, and phenol and phenyl acetate are detected in the distillate by GLPC analysis.

After work-up as in the previous examples, this polymer is found to have an inherent viscosity of 4.0 and a DSC endothermic transition at 250° C.

Fibers are spun at 300° C. through a jet of 0.007 in. diameter. Single filaments collected from spinning at 0.14 g/min. through-put, and wound up at 314 m/min. had the following properties:
7.2 g/d tenacity
1.8% elongation
521 g/d initial modulus
3.96 denier/fil When this fiber is heat-treated for 30 hours at 280°, the properties increase to 9.8 g/d tenacity, 2.7% elongation, and 416 g/d initial modulus. Another fiber with as-spun properties of 6.1 g/d tenacity; 2.0% elongation; 392 g/d initial modulus; and, 6.7 denier/fil increased to 10.9 g/d tenacity; 3.1% elongation; and 409 g/d initial modulus when heat treated for 30 hours at 280° C.

Comparative Example IV

The same quantities of monomers, acetic anhydride, and sodium acetate used in Comparative Examples I-III are employed. The acetylation reaction schedule is as follows: room temperature to 140° C., 1 hr.; acetylation at 140° C., 1 hr.; 140° C. to 330° C., 3 hours; 120 Torr vacuum at 330° C. for 1 hour and 0.45 Torr for an additional hour. Phenol is present in the condenser and the distillate. FTIR found the 4-hydroxybenzoic acid:6-hydroxy-2-naphthoic acid ratio of this polymer to be 63:37; the monomer charge ratio was 70:30. Its I.V. is 2.58 and DSC finds an endothermic transition at 245° C.

Fibers are spun at 255° C. through a 0.007 in. jet. At a through-put rate of 0.14 g/min. and fiber wind-up speed of 216 m/min., the single fil properties are:
5.6 g/d tenacity
1.44% elongation
515 g/d initial modulus
5.9 denier/fil Comparative Example V This example is analogous to Cottis, et al, U.S. Pat. No. 3,637,595, Example 1 thereof, in that acetylation via acetic anhydride occurs in the presence of a diluent; the Cottis example used Therminol 77 as the diluent reaction medium while this example employs p-xylene (as in Examples III and IV).

The apparatus described in Example 1 is charged with 57.8 g of 4-hydroxybenzoic acid (0.375 mole) and 23.5 g of 6-hydroxy-2-naphthoic acid (0.125 mole). After evacuating and purging the flask 3 times with nitrogen, 50 ml of p-xylene (Aldrich Chemical, 99+%) and 47.2 ml of acetic anhydride (0.50 mole) are added. The temperature of the reaction flask is raised from room temperature to 120° C. in 30 minutes and maintained at 120° for 30 minutes before raising the bath temperature to 250° over the period of one hour; 81% of the theoretical distillate (xylene + acetic acid) has been removed at this time. Polymerization continues for 3 hours, under nitrogen between the temperatures of 250° C. and 340° C.

Further polymerization under reduced pressure (2 Torr) is conducted for 1 and ½ hours at 340° C. Weak brittle fibers are removed from the melt via stirrer, under a blanket of nitrogen.

After grinding and extracting the polymer as in previous examples, its I.V. is 1.46 and DSC finds an endothermic transition at 300° C. The polymer is spun at 300° C. at a through-put rate of 0.42 g/min., and monofilaments are wound up at 140 m/min. The monofil properties are:
2.08 g/d tenacity,
1.46% elongation,
182 g/d initial modulus,
27.0 denier/fil.

The following Comparative Example demonstrates the preparation of an aromatic polyester when using acetylated monomers which have been separated from the acetylation reaction mixture and vessel.

Comparative Example VI

To a three-neck, round bottom flask equipped with a stirrer, argon inlet tube, and a heating tape wrapped distillation head connected to a condenser are added the following:
(a) 67.5 g p-acetoxybenzoic acid (0.375 mole), and
(b) 28.7 g 6-acetoxy-2-naphthoic acid (0.125 mole).

The charged flask is vacuum purged with argon three times and brought to a temperature of 250° C. At 250° C. the clear, slightly tinted reaction solution is stirred rapidly under a slow stream of dry argon while acetic acid is distilled from the polymerization vessel. The reaction melt turned opaque with suspended polymer after approximately 9 ml. of acetic acid are collected. The polymerization mixture is stirred for 3 hours at 250° C. About 24 ml. of acetic acid are collected during these stages. The polymerization temperature is next increased to 320° C. The viscous polymer melt is held for 25 minutes at 320° C. under an argon flow and then subjected to a series of reduced pressure stages. The argon flow is halted and the pressure above the stirred polymer melt is reduced to and held at 240 mm. of mercury for about 5 minutes. Over the next 9 minutes the pressure is reduced in stages to about 0.1 to 0.2 mm. of mercury and maintained at this pressure level for about 26 minutes. During these stages the polymer melt continued to increase in viscosity and is stirred more slowly while the remaining acetic acid is removed from the reaction vessel. Upon cooling (i.e., to about 25° C.) the polymer plug is finely ground and dried in a forced air oven at 150° C. for 50 to 60 minutes.

The resulting wholly aromatic polyester (about 65 g) has an inherent viscosity (I.V.) of 5.7 as determined in a pentafluorophenol solution of 0.1 percent by weight concentration at 60° C. The relative vicosity is measured by dividing the flow time in a capillary viscometer of the polymer solution by the flow time for the pure solvent.

When the polymer is subjected to differential scanning calorimetry (DSC), it exhibits a sharp melt endotherm at about 302° C. (peak), which is repeated at about 302° C. on subsequent remelt scans. The polymer melt is thermotropic. When the melt is cooled in the differential scanning calorimeter at a rate of −20° C./min., a sharp polymer crystallization exotherm is observed at about 270° C. (peak).

The polymer is melt extruded into a continuous filament of about 15 denier per filament.

More specifically, the polymer melt while at a temperature of about 310° C., is extruded through a spinneret provided with a single hole jet having a diameter of 20 mils and a length of 100 mils. The extruded filament is quenched in ambient air (i.e. at 72° F. and 65 percent relative humidity). The as-spun filament is taken up at a rate of 150 meters per minute.

The resulting as-spun wholly aromatic polyester fiber exhibits the following average single filament properties:
12.1 g/d tenacity
2.80% elongation
541 g/d initial modulus Following thermal treament in a dry nitrogen flow at 250° C. for 90 hours, the fiber exhibits the following average single filament properties:
20 g/d tenacity
5% elongation
550 g/d initial modulus As can be seen from the aforegoing examples, the present invention allows one the economic advantage of in situ acetylation without sacrificing polymer properties. Particularly good results are obtained when an acid acetylation catalyst is used and neutralized with a suitable basic reagent prior to polymerization (Example IV).

Although the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A process for preparing an aromatic polyester comprising:
   (i) reacting at least one aromatic hydroxy moiety containing compound with an isopropenyl ester of an alkyl acid under esterification, reaction conditions, and
   (ii) reacting the esterified compounds with at least one aromatic acid moiety containing compound in the resultant esterification reaction mixture of (i) under polyester polymerization conditions.

2. The process of claim 1 wherein isopropenyl acetate is reacted with at least one aromatic hydroxy moiety containing compound under acetylation reaction conditions, and then reacting the acetylated compounds with at least one aromatic acid moiety containing compound in the resultant acetylation reaction mixture.

3. The process of claim 2 wherein the aromatic acid is present during the acetylation reaction.

4. The process of claim 2 or 3 wherein at least one of the aromatic acid moiety containing compounds is also at least one of the aromatic hydroxy moiety containing compounds.

5. The process of claim 2 wherein the acetylation reaction is conducted in the presence of a catalytic amount of an acetylation catalyst.

6. The process of claim 5 wherein the acetylation catalyst is a strong acid catalyst selected from the group consisting of p-toluenesulfonic acid, sulfosalicylic acid, methanesulfonic acid, hydrogen chloride, hydrogen bromide, perchloric acid and sulfuric acid.

7. The process of claim 6 wherein said catalyst is selected from the group consisting of p-toluenesulfonic acid and methanesulfonic acid.

8. The process of claim 6 wherein a basic neutralizing agent is added to the acetylation reaction mixture upon termination of the acetylation in order to neutralize the acid catalyst.

9. The process of claim 8 wherein said basic neutralizing agent is metallic hydroxide.

10. The process of claim 8 or 9 wherein the neutralizing agent is barium hydroxide.

11. The process of claim 2 wherein the reaction temperature of the acetylation step (i) is in the range of from about 60° C. to about 130° C.

12. The process of claim 2 wherein the reaction temperature is raised to a temperature in the range of from about 180° to 350° C. upon initiation of the polymerization (ii).

13. The process of claim 2 wherein the reaction temperture during the polymerization step (ii) is in the range of from about 225° to about 350° C.

14. The process of claim 2 wherein the polyester polymerization reaction (ii) is conducted in the presence of a catalytic amount of a polymerization catalyst.

15. The process of claim 2 wherein the polymerization reaction (ii) is conducted under melt polymerization conditions.

16. The process of claim 2 wherein an hydroxy benzoic acid is employed as an aromatic hydroxy moiety containing compound and an aromatic acid.

17. The process of claim 16 wherein p-hydroxy benzoic acid is employed.

18. The process of claim 2 wherein the isopropenyl acetate is reacted in (i) with p-hydroxy benzoic acid and 6-hydroxy-2-naphthoic acid.

19. The process of claim 18 wherein the aromatic acid moiety containing compound of (ii) comprises the acetylated p-hydroxy benzoic acid and 6-hydroxy-2-naphthoic acid.

20. The process of claim 2 wherein the isopropenyl acetate is reacted with p-hydroxy benzoic acid, 6-hydroxy-2-naphthoic acid and an aromatic diol in (i).

21. The process of claim 20 wherein said aromatic diol comprises hydroquinone.

22. The process of claim 20 wherein aromatic acid of (ii) is comprised of an aromatic diacid.

23. The process of claim 22 wherein the aromatic diacid is terephthalic acid.

24. The process of claim 2 wherein the aromatic-hydroxy moiety containing compound is comprised of a hydroxy naphthoic acid.

25. The process of claim 24 wherein the hydroxy naphthoic acid is 6-hydroxy-2-naphthoic acid.

26. The process of claim 24 wherein the isopropenyl acetate is reacted with a hydroxy naphthoic acid and an aromatic diol in (i).

27. The process of claim 26 wherein said aromatic diol is hydroquinone.

28. The process of claim 26 wherein the aromatic acid of (ii) is comprised on an aromatic diacid.

29. The process of claim 28 wherein the aromatic diacid is terephthalic acid.

30. A process for preparing a wholly aromatic polyester comprising reacting a hydroxybenzoic acid and a hydroxy naphthoic acid with an isopropenyl ester of an alkyl acid under esterification reaction conditions to thereby esterify the hydroxy moieties of the hydroxy benzoic acid and hydroxy naphthoic acid and then raising the temperature of the reaction mixture to a temperature sufficient to initiate polymerization and conducting the polymerization under polyester polymerization reaction conditions.

31. The process of claim 30 wherein the isopropenyl ester of an alkyl acid is isopropenyl acetate.

32. The process of claim 31 wherein the acetylation is conducted at a temperature in the range of from about 60° C. to about 130° C. and the polymerization is conducted at a temperature in the range of from about 180° C. to about 350° C.

33. The process of claim 31 wherein p-hydroxybenzoic acid and 6-hydroxy-2-naphthoic acid are reacted with isopropenyl acetate at a temperature in the range of from about 60° C. to about 130° C. in the presence of an acid catalyst until acetylation is completed, adding a basic reagent in an amount sufficient to neutralize the acid catalyst and then raising the reaction temperature to a temperature sufficient to initiate polymerization and conducting the polymerization at a temperature in the range of from about 250° C. to about 350° C.

34. The process of claim 33 wherein the acid catalyst is selected from the group consisting of methanesulfonic acid and p-toluenesulfonic acid and the basic reagent is barium hydroxide.

35. A process for preparing an aromatic polyester comprising heating at least one aromatic hydroxy compound and at least one aromatic acid compound in the presence of an isopropenyl ester of an alkyl acid at an esterification temperature and then at a polymerization temperature to thereby form the aromatic polyester.

36. The process of claim 35 wherein the isopropenyl ester of an alkyl acid is isopropenyl acetate.

37. The process of claim 36 wherein an acid acetylation catalyst is employed and a basic reagent is added upon completion of acetylation in an amount sufficient to neutralize the acid catalyst.

38. The process of claim 37 wherein the basic reagent is barium hydroxide.

39. The process of claim 1, wherein the aromatic hydroxy moiety containing compound comprises at least one of an aromatic diol or aromatic hydroxy acid, and the aromatic acid moiety containing compound comprises at least one of an aromatic diacid, or aromatic hydroxy acid or derivative thereof.

* * * * *